3,258,346
Patented June 28, 1966

3,258,346
CURING MATERIALS AND METHOD FOR SILICATE COATINGS
John R. Fisher, Jr., Dayton, Ohio, assignor to Industrial Metal Protectives, Inc., Dayton, Ohio, a corporation of Delaware
No Drawing. Filed Apr. 27, 1961, Ser. No. 105,893
4 Claims. (Cl. 106—14)

This invention relates to an improved chemical curing material and method for silicate compositions employed as protective coatings on metal and other surfaces.

Silicate compositions including a metallic dust therein to provide corrosion and galvanic protection are known and employed to form a protective coating on a ferrous base material in order to provide a surface which is protected against weather, salt sprays, and corrosion generally. The silicate compositions heretofore employed include an alkali silicate such as sodium, potassium and lithium, and mixtures thereof, having dispersed therein metallic dust such as zinc, aluminum, copper and oxides of such metals, and other electrically conductive pigments or mixtures thereof, and may be applied to a metallic or non-metallic base as by brushing, spraying, rolling, immersing and the like. Under normal conditions, the coating will be cured to an insoluble state in about three to six days, but in cold damp weather it may take from two to three weeks, while in direct sunlight the insoluble condition may be achieved in about forty-eight hours. The hardening or curing process above described may also be achieved heating the surface from about 200° to about 500° F. for causing the coating to become insoluble.

As can be understood, circumstances arise wherein it is desired to achieve curing as quickly as possible without employing heated ovens or infrared lamps and the like, for example, in treating large surface areas of metal such as ship hulls, ship holds, large storage tanks, as well as relatively small items employed in assembly line manufacture, and it may not be practical or desirable to employ infrared lamps and the like to achieve rapid curing. It is therefore a primary object of this invention to provide a chemical curing process and composition for use with silicate coating compositions to cure the coating in relatively short time to a condition of insolubility and hardness for providing a coating having the desired corrosion and galvanic protection.

Another object of this invention is the provision of a chemical curing agent for use with silicate coatings which may be applied over a silicate coating a relatively short time after application of the coating to a base surface, and which is operative to effect curing of the silicate composition in a relatively short time.

It is a further object of this invention to provide a protective coating which is the reaction product of a chemical curing agent and a silicate coating material.

Still a further object of this invention is the provision of a process for curing a silicate coating in a relatively short period of time while maintaining the coating free of cracks and crazes.

Other objects and advantages of the invention will be apparent from the following description and the appended claims.

The silicate coating material employed to provide a protective coating may include an alkali metal silicate and a finely divided electroconductive pigment. The silicate is preferably formed of an alkali material such as an alkali metal oxide of the $M_2O$ type which is reacted with $SiO_2$ to form an alkali metal silicate. The reaction product of the alkali metal oxide and $SiO_2$ may vary considerably depending on the mole ratio of the reactants, be identified as those formed from the reaction between and accordingly, the preferred metallic alkali silicate may two to three moles of silica for each mole of the alkali metal oxide.

In order to provide the necessary corrosion and galvanic protection in the final coating, a finely divided electroconductive pigment is added to the water soluble alkali metal silicate above described in a proportion of about 20% to 30% alkali metal silicate and about 70% to 80% powdered pigment. It has been observed especially in the case of finely divided zinc dust, present in the above amounts, that the coating adheres to the base in a satisfactory manner and provides the desired resistance to corrosion and conductivity for galvanic protection. It is to be understood that the percentage or ratio of metal oxide to silica as well as the ranges of pigment to alkali metal silicate may be varied as desired; however, the above ratios are believed to represent optimum percentages. It may be desirable to intermix given amounts of powdered aluminum, copper and zinc, or the oxides thereof to vary the characteristics of the silicate coating in accordance with the desired characteristics of the final coating. It has been observed above that the ratio of about 1:3 of metal oxide to silica, the alkali metal silicate tends to crack when applied to a suitable base to form relatively thick coatings, while at ratios below 1:2, the water solubility of the coating is higher than that of the material in the range of 1:2–1:3, and it may be more difficult to cause the coating to reach an insoluble state.

Variation in the percentage of electroconductive pigment in addition to altering the corrosion and galvanic protection afforded has the effect of varying the adhesiveness or ability of the coating to adhere to a base member. If too much pigment is present, the adhesiveness may be such that the coating will peel or crack, or the coating will be ineffective to provide protection for extended periods of time, and accordingly the percentage of metallic dust is limited for these reasons. On the other hand, decreasing the amount of metallic dust over that previously indicated results in a decrease in the corrosion and galvanic protection of the silicate coating composition. As can be understood, the proportions set forth above represent optimum proportions since the film adheres properly while providing the desired galvanic and corrosion resistant characteristics required in most cases.

If desired, a small amount of lead compounds such as red lead, and lead chromate, may be added to the silicate composition to reduce the attack by the alkali on the finely divided pigment and effect an increase in the curing rate. Other agents may also be added in various amounts to effect antifouling and the like as disclosed in United States Patents 2,509,875, 2,576,845, both assigned to the assignee of the present application.

After application of the silicate coating composition, a chemical curing agent is applied over the silicate coating to effect curing of the silicate material by reacting with the metallic silicate portion of the silicate composition to form an insoluble gel which is liquid impervious and water insoluble. Evenly distributed throughout the insoluble gel coating is a finely divided metallic dust, of the type previously described, which is operative to provide the desired corrosion and galvanic protection, as is well known in the art. The curing agent is preferably a water-alcohol solution containing a metallic salt capable of reacting with a portion of the alkali metal silicate, and a mineral or organic acid which reacts with the remaining alkali metal silicate to form an insoluble silicate gel. In a preferred embodiment, an inhibitor is present in the solution to effect controlled release of the acid radicals in order to eliminate, to a substantial degree, any cracking of the silicate base coating during cure. Such cracking or crazing of the silicate base coat may occur if the acid radicals are released at too high a rate or react with the silicate at too fast a rate.

The metallic salt may be present in an amount ranging from 4.5% to about 23% of the total weight of the solution depending on the particular salt employed. Any metal salt may be employed which reacts with the silicate to form an insoluble metal silicate, for example, chlorides and sulphates of calcium, cobalt, magnesium, manganese and molybdenum, and the like, or double salts such as zinc ammonium sulphate. The metallic salt operates to form an insoluble silicate by reacting with part of the alkali metal silicate, and thus a portion of the applied silicate coating is insolubilized upon contact with the salt. It has been found advantageous to employ at least about 4.5% of the salt as previously noted in order to prevent cracking of the coating during the chemical curing phase.

During the initial contact between the chemical curing agent and the silicate base coat, the metallic salt reacts with a portion of the silicate to form an insoluble metallic silicate at the interface between the chemical curing composition and the silicate base coating. This insoluble metal silicate functions as a membrane, to some extent, to allow passage of controlled amounts of acid into the silicate material for a gelation of the silicate coating compound. It is to be understood that the insoluble silicate gel is porous in nature and permeable to the extent that it allows small quantities of electrolyte into the coating during curing thereof and upon final curing allows the electrolyte to penetrate the coating in order to contact the dispersed metallic dust therein for providing the desired cathodic protection.

In accordance with the present invention, it has been noted that the presence of about 22% of a magnesium salt operates to provide the desired reaction between the silicate and the manganese salt for the formation of the permeable membrane-like coating along the interface of the silicate coating and chemical curing agent. In the event that less than 4.5% of a metallic salt is employed in the curing agent, cracking or crazing of the silicate composition may occur due to the fact that the surface of the silicate coating composition is not uniformly covered with the insoluble metallic silicate, and thus, an uncontrolled amount of acid is capable of penetrating into the silicate base coating causing a spontaneous and almost instantaneous reaction resulting in severe cracking of the coating.

It is well known that the reaction between an acid and a silicate results in an insoluble gel possessing the porous characteristics previously noted. The gel has been described as a mass containing many minute capillary spaces and thus is not absolutely impermeable. As can be understood, an instantaneous reaction between an acid and a silicate while operative to form a gel in particulate form is inoperative to form a gel in the form of a film which remains permanently adhered to a base surface. In accordance with the present invention, an acid is employed in an amount ranging from about 23% to 49% by weight of the total solution to effect formation of a gel under controlled conditions capable of adhering to a surface. Any mineral or organic acid may be employed capable of forming an insoluble gel structure as for example, nitric, sulphuric, hydrochloric, phosphoric, phthalic, tartaric, acetic, chloroacetic, maleic, malonic, fumaric, butric, oxalic and the like, as well as combinations thereof.

In a preferred embodiment, approximately 43% to 45% of acid is present with other constituents to react with the silicate to form an insoluble gel. As was mentioned previously, the acid radicals liberated at a controlled rate penetrate through the insoluble somewhat porous metal silicate present at the interface of the curing agent and silicate coating formed by the reaction of the metallic salt and the silicate to effect an even and uniform gelation of the silicate.

It is preferred that a water-alcohol solution be employed which is operative to provide a small amount of softening of the membrane-like silicate coating formed at the interface as above described. In accordance with this invention distilled or natural water is present in an amount of 10 to 25%, and alcohol is present in an amount of 20 to 47% for providing the desired softening of the semi-cured coating, and for providing an electrolyte for the formation of acid radicals required to cause gelation of the silicate. Among the alcohols which may be employed are methyl, ethyl, butyl, amyl, and higher alcohols as well as the primary, secondary or tertiary homologs in addition to the normal or iso forms, or combinations of alcohols.

To assist in controlling the rate of the reaction between the acid and the silicate, there is present in the curing agent approximately 0.5% to 1% of an inhibitor which operates to buffer the pH of the solution and which cooperates with the insoluble metal silicate formed at the interface to release a controlled amount of acid into the body of the silicate composition. It has been found that sodium or potassium, chromate, dichromates, or sodium and potassium molybdenates as well as combinations thereof operate in a satisfactory manner to provide the desired controlled release of acid radicals for reaction with the silicate base coating.

The following specific examples illustrate several formulations which may be employed satisfactorily to provide a chemical curing agent of the type previously described.

*Example I*

| | Percent |
|---|---|
| Manganese chloride | 4.72 |
| Water | 23.58 |
| Hydrochloric acid | 23.58 |
| Isopropyl alcohol | 47.16 |
| Potassium dichromate | .96 |

*Example II*

| | Percent |
|---|---|
| Manganese sulphate or chloride | 23.00 |
| Water | 10.00 |
| 85% phosphoric acid (ortho) | 49.00 |
| Isopropyl alcohol | 17.00 |
| Potassium chromate | 1.00 |

*Example III*

| | Percent |
|---|---|
| Magnesium sulphate | 22.00 |
| Water | 11.00 |
| Phosphoric acid | 45.00 |
| Isopropyl alcohol | 21.10 |
| Sodium chromate | 0.90 |

*Example IV*

| | Percent |
|---|---|
| Zinc ammonium sulphate | 4.50 |
| Water | 25.00 |
| Fumaric acid | 23.00 |
| Isoamyl alcohol | 47.00 |
| Potassium molybdenate | 0.50 |

*Example V*

| | Percent |
|---|---|
| Calcium chloride or sulphate | 10.00 |
| Water | 25.00 |
| Maleic acid or phthalic | 34.25 |
| 50–50 mixture of isopropyl and ethyl alcohol | 30.00 |
| Sodium chromate | 0.75 |

*Example VI*

| | Percent |
|---|---|
| Cobalt chloride or sulphate (ic and ous) | 15.00 |
| Water | 20.00 |
| Mixed acetic and malonic (50–50 mixture) | 35.00 |
| Mixed methyl and isopropyl alcohol (50–50 mixture) | 29.00 |
| Potassium or sodium dichromate | 1.00 |

The above solutions were prepared by dissolving the metallic salts and the inhibitors in slightly warm water, and thereafter the acid was added followed by the addition of the alcohol. It is not essential that the above order be followed in combining the ingredients; however, the addition of the salts and the inhibitor to slightly warm water is desirable since the salts are dissolved quite readily.

In physical appearance, the solution possesses a color dependent upon the ingredients present therein, and a small amount of undissolved salt may be present depending on the particular formulation. The curing agent formulated as above described may be shipped as a prepackaged item ready for use by the consumer. If desired, the curing agent formulated as above described may be applied about 45 to 90 minutes after application of the silicate coating, and operates to provide a heat insoluble cured silicate in about one to three hours. It has been found that the curing agent formulated as set forth in Examples II and III is preferred and produces exceptional results in that either of these agents may be applied about 45 minutes after application of the silicate composition in order to effect a substantially complete cure in about one hour.

While the products and methods herein disclosed constitute preferred embodiments of the invention, it is to be understood that the invention is not limited to these precise products and methods, and that changes may be made therein without departing from the scope of the invention which is defined in the appended claims.

What is claimed is:

1. A base material having on at least one surface a protective coating comprising the reaction product of a silicate coating composition and a curing agent, said silicate coating composition including a water insoluble alkali metal silicate having dispersed therein a finely divided electroconductive pigment, said curing agent including a water-alcohol solution of about 4.5% to 23% by weight of the total solution of a metallic salt and about 23% to 49% by weight of the total solution of an acid for effecting formation of an insoluble metal silicate and an insoluble silicate gel, said curing agent including an inorganic metal salt present in said solution in an amount by weight of 0.5% to 1% based on the total weight of said solution for controlling the rate of reaction of said acid and said alkali metal silicate by controlling the release of acid radicals, said metallic salt being selected from the group consisting of chlorides and sulphates of calcium, cobalt, magnesium, manganese, molybdenum and zinc ammonium sulphate, said acid being selected from the group consisting of nitric, sulphuric, hydrochloric, phosphoric, phthalic, tartaric, acetic, chloroacetic, maleic, malonic, fumaric, butric, oxalic, and combinations thereof, and said inorganic metallic salt being selected from the group consisting of sodium and potassium, chromates, dichromates, and sodium and potassium molybdenates, and combinations thereof.

2. The method of curing a silicate coating including a water-soluble alkali metal silicate having dispersed therein an electroconductive pigment comprising applying to said coating a chemical curing agent including a water-alcohol solution of 4.5% to 23% by weight of the total solution of a metallic salt capable of reacting with said soluble silicate to form an insoluble metal silicate, an acid present in said solution in an amount of about 23% to 49% by weight of the total solution for converting the water soluble silicate to an insoluble gel, said curing agent including about 0.5% to 1% by weight of the total solution of an inorganic metal salt for controlling the rate of reaction between said acid and said soluble silicate by controlling the release of acid radicals, said metallic salt being selected from the group consisting of chlorides and sulphates of calcium, cobalt, magnesium, manganese, molybdenum and zinc ammonium sulphate, said acid being selected from the group consisting of nitric, sulphuric, hydrochloric, phosphoric, phthalic, tartaric, acetic, chloroacetic, maleic, malonic, fumaric, butric, oxalic, and combinations thereof, and said inorganic metallic salt being selected from the group consisting of sodium and potassium, chromates, dichromates, and sodium and potassium molybdenates, and combinations thereof.

3. A method as set forth in claim 2 wherein said metallic salt is present between about 22% to 23% by weight of the total solution, said acid being present in an amount between about 45% to 49% of the total solution, and said inorganic metallic salt being present by weight in an amount between about 0.9% to 1% by weight of the total solution.

4. A composition of matter for use as a curing agent with alkali metal silicate materials comprising a water-alcohol solution of about 4.5% to 23% by weight of the total solution of a metallic salt capable of reacting with the silicate to form an insoluble metal silicate, about 23% to 49% by weight of the total solution of an acid operative to form an insoluble silicate gel, and about 0.5% to 1% by weight of the total solution of an inorganic metal salt for controlling the rate of reaction between said acid and said soluble silicate by controlling the release of acid radicals, said metallic salt being selected from the group consisting of chlorides and sulphates of calcium, cobalt, magnesium, manganese, molybdenum and zinc ammonium sulphate, said acid being selected from the group consisting of nitric, sulphuric, hydrochloric, phosphoric, phthalic, tartaric, acetic, chloroacetic, maleic, malonic, fumaric, butric, oxalic, and combinations thereof, and said inorganic metallic salt being selected from the group consisting of sodium and potassium, chromates, dichromates, and sodium and potassium molybdenates, and combinations thereof.

References Cited by the Examiner

UNITED STATES PATENTS

| | | | |
|---|---|---|---|
| 2,944,919 | 7/1960 | Morris et al. | 106—84 |
| 2,952,562 | 9/1960 | Morris et al. | 106—14 |
| 2,998,328 | 8/1961 | Munger et al. | 106—84 |

FOREIGN PATENTS

| | | |
|---|---|---|
| 116,512 | 3/1946 | Australia. |
| 831,163 | 3/1960 | Great Britain. |

ALEXANDER H. BRODMERKEL, *Primary Examiner.*

JOSEPH REBOLD, *Examiner.*

J. POER, J. E. CARSON, J. E. CALLAGHAN, L. HAYES, *Assistant Examiners.*

UNITED STATES PATENT OFFICE
CERTIFICATE OF CORRECTION

Patent No. 3,258,346　　　　　　　　　　　　　　June 28, 1966

John R. Fisher, Jr.

It is hereby certified that error appears in the above numbered patent requiring correction and that the said Letters Patent should read as corrected below.

Column 1, line 72, strike out "be identified as those formed from the reaction between" and insert the same after "silicate may", in line 1, column 2.

Signed and sealed this 25th day of July 1967.

(SEAL)
Attest:

EDWARD M. FLETCHER, JR.　　　　　　　　EDWARD J. BRENNER
Attesting Officer　　　　　　　　　　　　　　Commissioner of Patents